United States Patent Office 3,549,762
Patented Dec. 22, 1970

3,549,762
USE OF 2,6-DICYANOTRICHLOROPYRIDINE AS
AN INDUSTRIAL BIOCIDE
Russell M. Bimber, Painesville, Ohio, assignor to Diamond
Shamrock Corporation, a corporation of Delaware
No Drawing. Filed Sept. 6, 1967, Ser. No. 665,743
Int. Cl. A01n 9/22
U.S. Cl. 424—263       7 Claims

ABSTRACT OF THE DISCLOSURE

For industrial application, 2,6-dicyanotrichloropyridine exhibits outstanding activity as a biocidal agent for the killing and/or control of growth of microorganisms, such as fungi or bacteria on substrates such as plastics, leather, textiles or paint films. It may be incorporated in the material prior to shaping, e.g., in paint or plastics formulations, or it may be effectively applied on the surface of the substrate. Effective amounts of the compound range generally from 0.05% to 3%, preferably from 0.1% to 1%, by weight of the total formulation or by weight of the solution from which it is applied.

BACKGROUND OF THE INVENTION

This invention relates to novel biocidal compositions and to methods for their preparation, and in particular relates to biocidal compositions containing effective amounts of 2,6-dicyanotrichloropyridine as the biocidal agent and to the use of these compositions for inhibiting microbiological deterioration of plastics, leather, textiles, paints and of many other substrates or media subject to microbial attack.

The use of various compounds such as heavy metal toxicants and especially mercury- or copper-based compounds as biocidal agents is well known. Likewise, non-metallic organic compounds which typically contain mercapto linkages and/or elements such as chlorine, sulfur and nitrogen are also available commercially for use in preventing microbiological deterioration of a large variety of substrates.

In U.S. Pat. No. 3,325,503, issued June 13, 1967, there are described and claimed, among other related novel compounds, isomeric polychlorodicyanopyridines conforming to the structural formula:

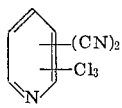

Exemplary compounds within this class are 2,4-dicyanotrichloropyridine, 2,5-dicyanotrichloropyridine, 2,6-dicyanotrichloropyridine and 3,5-dicyanotrichloropyridine. As reported in U.S. Pat. No. 3,325,503, these chlorinated cyano-substituted pyridines are, as a group, effective pesticidal agents for the killing and/or controlling of the growth of plants, insects, nematodes, microorganisms, fungi and compounds, 2,6-dicyanotrichloropyridine surprisingly and the like. In particular, these compounds have been found to possess excellent fungicidal properties.

As set forth in the aforementioned patent, these compounds are prepared by contacting at significantly elevated temperatures, e.g., 200° to 500° C., and in the presence of a solid catalyst chlorine and the appropriate cyano-substituted pyridine, preferably in the vapor phase. This chlorination procedure is outlined in detail in U.S. Pat. No. 3,325,503, which disclosure is incorporated herein by reference.

SUMMARY OF THE INVENTION

It has now been found that within the previously described group of halogenated dicyano-substituted pyridine compounds, 2,6-dicyanotrichloropyridnne surprisingly and unexpectedly exhibits superior biocidal activity by comparison to its isomers, i.e., those compounds of the group wherein the cyano groups are attached to other than the 2- and 6-positions on the pyridine nucleus. The outstanding activity of this compound as an industrial biocide is especially surprising in view of the fact that its effectiveness in controlling microorganisms such as fungi and bacteria on plants and/or in soil for agricultural applications, is not indicated to be particularly superior to its isomers.

2,6-dicyanotrichloropyridine is effective in inhibiting the growth of fungi and other microorganisms such as bacteria on paint films, plastics, leather and textiles even after exposure of these substrates to weathering conditions for extended periods of time. Effective amounts of the compound range generally from 0.05% to 3%, preferably from 0.1% to 1%, by weight of the total formulation in which it is incorporated or by weight of the solution from which it is applied to the surface of the substrate.

DETAILED DESCRIPTION OF THE PREFERRED EMBODIMENTS

As used herein in the specification and claims, the terms "viocide" and "biocidal" are intended to refer to the control and/or killing of microorganisms such as fungi or bacteria. Thus it will be appreciated that applications commonly termed fungicidal and bactericidal are contemplated.

The organic biocidal agent of this invention has the structural formula:

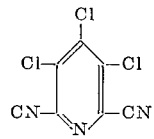

This compound has a melting point of 200° C. Insoluble in water, it is soluble in all of the common organic liquids typically used as solvent media for the industrial utilization and application of organic compounds. Among the many suitable organic solvents for 2,6-dicyanotrichloropyridine are hydrocarbons such as benzene, toluene, xylene, kerosene, diesel oil, fuel oil and petroleum naphtha; ketones such as acetone, methyl ethyl ketone and cyclohexanone; chlorinated hydrocarbons such as carbon tetrachloride, chloroform, trichloroethylene and perchloroethylene; esters such as ethyl acetate, amyl acetate and butyl acetate; the monoalkyl ethers of ethylene and diethylene glycol, e.g., the monomethyl or monoethyl ethers; and alcohols such as ethanol, isopropanol and amyl alcohol. Being insoluble in water, this compound advantageously is not leached by water from the subtrate on which it is applied and thus maintains its biocidal effectiveness over long time periods.

When incorporated in paint formulations, particularly the oil-based systems, 2,6-dicyanotrichloropyridine exhibits biocidal activity superior to that of both the mercury-based and non-mercurial compounds which are principally used at present as microbiological protectants for paint. It is compatible with all conventional coating systems and its inclusion in paint compositions does not deleteriously affect their application properties, i.e., adherence to various substrates, or their film-forming and drying capabilities. Likewise, coatings applied with the biocidal paint compositions of this invention exhibit a smooth glossy finish which is maintained over long periods of time. Paint compositions containing the biocidal agent of this invention are prepared according to conventional mixing and grinding techniques such as three-roll mills, etc., using conventional raw materials as normally used in paint preparation. Such materials include pigments as titanium dioxide; fillers such as aluminum silicate or calcium silicate; thickeners such as bentonite; and driers such as metallic naphthenates. The paint compositions may likewise contain resinous paint bases and solvents or thinners, typified by mineral spirits and naphtha, benzene, toluene, methyl ethyl ketone, xylene, etc.

When incorporated in plastics formulations or when applied to the surface of plastic articles such as films, sheeting or various molded objects, 2,6-dicyanotrichloropyridine exhibits marked biocidal superiority over known and used biocidal compounds and maintains its effectiveness to a greater degree over extended periods of time. Likewise, it is effective against the growth of both gram-negative and gram-positive bacteria on plastic surfaces as well as on other surfaces.

When treated with this compound and then contacted with various microorganisms, leather surfaces show no growth of any of these microorganisms even over extended time periods. 2,6-dicyanotrichloropyridine is likewise effective for preventing microbial deterioration of treated surface is allowed to dry prior to being put into microbial attack in pulp, paper, and sludge processes and in oil recovery operations.

The amount of 2,6-dicyanotrichloropyridine employed to provide the desired biocidal activity ranges generally from about 0.05% to 3%, by weight of the total composition in which it is incorporated as, for example, in paints and in plastic formulations. In practice, therefore, the prescribed amount of compound is thus incorporated in the paint composition prior to spreading. Likewise, it is incorporated in the plastic formulation prior to processing operations for the plastic. Alternatively, 2,6-dicyanotrichloropyridine is applied to the surface of the substrate, e.g., plastics, leather or textile, by contacting said surface with an organic solvent solution containing from 0.05% to 3%, preferably from 0.1% to 1%, by weight of the biocide. Application of the biocide in solution may be accomplished by any method known in the art for applying chemical solutions to solid surfaces as, for example, by brushing or spraying the solution onto the surface or by immersing the substrate in the solution. The particular method employed herein is not critical as long as the surface to be protected is thoroughly contacted with the biocidal agent. After application, the treated surface is allowed to dry prior to being put into use.

In order that those skilled in the art may more completely understand the present invention and the preferred methods whereby the same may be carried into effect, the following specific examples are offered. In these examples and elsewhere herein, where proportions of ingredients are expressed in parts, such proportions are by weight.

The following four examples show the comparative efficiency of the previously described isomeric polychlorodicyanopyridines, including the 2,6 - dicyanotrichloro compound as agricultural biocides, i.e., as agents for inhibiting and/or controlling the growth of microorganisms such as fungi and bacteria on plants or in soil.

EXAMPLE 1

This example illustrates the comparative efficiency of chlorinated-dicyano-substituted pyridine isomers in protecting tomato foliage against infection by the early blight fungus *Alternaria solani* (Ell. and Mart.) Jones and Grout and the late blight fungus *Phytophthora infestans* (Mont.) deBary. The method used employs tomato plants, 5 to 7 inches high which are 4 to 6 weeks old. Duplicate plants, one set for each test fungus, are sprayed with various dosages of the test formulation at 40 lbs./sq. in. air pressure while being rotated on a turntable in a hood. The center of the turntable is 45 inches from the nozzle of the spray gun. The test formulation containing the test compound, acetone, stock emulsifier solution and distilled water is applied at concentrations up to 2000 p.p.m. of the test chemical. Lower concentrations of toxicant are obtained by employing less toxicant and more water, thereby maintaining the same concentration of acetone and emulsifier.

After the spray deposit is dry, treated plants and controls (sprayed with formulation less toxicant) are sprayed while being rotated on a turntable with a spore suspension containing approximately 20,000 conidia of *A. solani* per ml., or 150,000 sporangia of *P. infestans* per ml. The atomizer used delivers 20 ml. in the 30-second exposure period. The plants are held in a saturated atmosphere for 24 hours at 70° F. for early blight and 60° F. for late blight to permit spore germination and infection before removal to the greenhouse. After two days from the start of the test for early blight and three days for late blight lesion counts are made on the three uppermost fully expanded leaves. The data are converted to percent disease control based on the number of lesions obtained on the control plants. Dosages and percent disease control are given in the following table:

TABLE I

| Compound | Concentration, p.p.m. | Percent disease control | |
|---|---|---|---|
| | | Early blight | Late blight |
| 2,4-dicyanotrichloropyridine | 256 | 96 | 100 |
| | 128 | 40 | 0 |
| 2,5-dicyanotrichloropyridine | 256 | 100 | 100 |
| | 128 | 100 | 100 |
| | 64 | 97 | 100 |
| | 32 | 87 | 100 |
| | 16 | 12 | 77 |
| | 8 | 0 | 53 |
| 2,6-dicyanotrichloropyridine | 256 | 100 | 100 |
| | 128 | 100 | 100 |
| | 64 | 100 | 100 |
| | 32 | 99 | 100 |
| | 16 | 48 | 87 |
| | 8 | 0 | 55 |
| 3,5-dicyanotrichloropyridine | 256 | 99 | 100 |
| | 128 | 65 | 77 |
| | 64 | 29 | 15 |

EXAMPLE 2

This example illustrates the comparative efficiency of the previously described chlorinated-dicyano-substituted pyridine isomers to inhibit the colonial growth of the following bacteria: *Erwinia amylovora* (E.a.), *Xanthomonas phaseoli* (X.p.), *Staphylococcus aureus* (S.a.), and *Escherechia coli* (E.c.), at various concentrations. The basic test formulation contains 0.125 g. of the test chemical (or 0.125 ml. if a liquid), 4.0 ml. acetone, 2.0 ml. stock emulsifier solution (0.5% Triton X–155 in water by volume) and 94.0 ml. distilled water, the concentration of toxicant in this formulation being 1250 parts per million. Lower concentrations of toxicant are obtained by diluting the basic formulation with distilled water.

Two ml. of each formulation is dispensed into a test tube which is then placed into a water bath maintained at 44° C. From a stock preparation (also held at 44° C.), 8 ml. of 20-percent nutrient agar is added to the test tube giving a 1:5 dilution or a final concentration of 250 p.p.m. chemical in the agar. The contents of the test tube are then thoroughly mixed, while still warm, with the aid of a Vortex type mixer and immediately poured into a sterile polystyrene Petri dish (100 x 15 mm.). After the agar in the plate is set, suspensions of each organism are simultaneously streaked onto the surface of the agar. After the plate is inoculated, it is incubated 24 to 48 hours at 30° C., after which time each organism is rated visually for growth inhibition by the candidate chemical. Estimates of percent growth inhibition are relative to growth of streak colonies in control plates obtained during individual tests. Using this procedure, the following results are obtained:

TABLE II

| Compound | Concentration, p.p.m. | Percent control | | | |
|---|---|---|---|---|---|
| | | E.a. | X.p. | S.a. | E.c. |
| 2,4-dicyanotrichloropyridine | 250 | 100 | 100 | 100 | 100 |
| | 128 | 100 | 100 | 100 | 100 |
| | 64 | 100 | 100 | 100 | 50 |
| | 32 | 100 | 100 | 100 | 0 |
| 2,5-dicyanotrichloropyridine | 250 | 0 | 100 | 100 | 0 |
| | 128 | 100 | 100 | 100 | 0 |
| | 64 | 0 | 0 | 0 | 0 |
| 2,6-dicyanotrichloropyridine | 250 | 0 | 100 | 100 | 0 |
| | 128 | 0 | 0 | 0 | 0 |
| 3,5-dicyanotrichloropyridine | 250 | 100 | 100 | 100 | 100 |
| | 128 | 0 | 100 | 100 | 0 |
| | 64 | 0 | 0 | 0 | 0 |

EXAMPLE 3

Test formulations of the chlorinated-dicyano-substituted pyridines are examined for ability to control tomato crown gall (*Agrobacterium tumefaciens*) when applied as soil fungicides. For each test, a formulation containing 0.24 g. of the test chemical (or 0.24 ml. if a liquid), 4.0 ml. acetone, 2.0 ml. stock emulsifier solution (0.5% Triton X–155 in water by volume), and 94.0 ml. distilled water is prepared. Individual tomato plants, var. Rutgers, are planted in 3½-inch clay pots and are 3 to 5 inches tall at treatment time. Stem puncture inoculation, at the cotylodonary node, with a cellular suspension of the *Agrobacterium tumefaciens* is made one to two hours prior to the soil drench treatment.

In the treatment, the test formulation is applied at the soil surface of each pot; 17.5 ml. of the formulation being equivalent to a dosage of the test chemical of 64 pounds per acre. Lower concentrations of toxicant are obtained by diluting the formulation with distilled water. Control is determined through visual observation of tumor formation 10 to 14 days after treatment. A rating of 90% is given to an estimate of complete control. Using this procedure, the following results are obtained:

TABLE III

| Compound | Dosage, lbs./a. | Percent control |
|---|---|---|
| 2,4-dicyanotrichloropyridine | 32 | 90 |
| | 8 | 90 |
| 2,5-dicyanotrichloropyridine | 64 | 90 |
| | 32 | 0 |
| 2,6-dicyanotrichloropyridine | 64 | 0 |

EXAMPLE 4

This test measures the comparative eradicant fungicidal action of the isomeric chlorinated-dicyano-substituted pyridines against the powdery mildew, *Erysiphe polygoni*. Garden bean plants, var. Tendergreen, about four to six inches tall, four per clay pot are treated. To test each compound, 80 ml. of a formulation containing 0.192 g. of the test compound, 10.0 ml. cyclohexanone, 8.0 ml. stock emulsifier solution (0.5% Triton X–155 in water by volume), and 62.0 ml. distilled water is sprayed on the plants as they are being rotated on a turntable in a spray hood. The concentration of toxicant in this formulation is 2400 parts per million. Lesser quantities of chemical are used when more dilute formulations are desired.

Before treatment the plants are naturally infested, via air-borne spores, with powdery mildew *Erysiphe polygoni* from a culture maintained in the greenhouse. Two weeks after treatment, percent mildew control is estimated. Using this procedure, the following results are obtained:

TABLE IV

| Compound | Concentration, p.p.m. | Percent disease control |
|---|---|---|
| 2,4-dicyanotrichloropyridine | 1,200 | 90 |
| | 600 | 40 |
| | 300 | 0 |
| 2,5-dicyanotrichloropyridine | 2,400 | 95 |
| | 1,200 | 100 |
| | 600 | 100 |
| | 300 | 85 |
| 2,6-dicyanotrichloropyridine | 2,400 | 98 |
| | 1,200 | 100 |
| | 600 | 98 |
| | 300 | 98 |
| 3,5-dicyanotrichloropyridine | 1,200 | 50 |
| | 600 | 90 |
| | 300 | 0 |

The above test results indicate that each of the polychlorodicyano-substituted pyridine isomers possesses biocidal activity for agricultural use against fungi and bacteria. There is no indication from these results that the 2,6-dicyanotrichloropyridine isomer alone possesses outstanding industrial biocidal activity as shown by the following examples.

EXAMPLE 5

Biocidal activity of 2,6-dicyanotrichloropyridine in paints

A paint formulation is prepared from the following ingredients:

| | Gm. |
|---|---|
| Titanium dioxide (anatase) | 684 |
| Titanium dioxide (rutile) | 684 |
| Magnesium silicate | 1080 |
| Alkyd resin (70% non-volatile) | 796 |
| Chlorinated paraffin (70% chlorine, by weight) | 400 |
| Raw linseed oil | 400 |
| Polymeric linseed oil | 238 |
| Mineral spirits | 654 |
| 24% lead naphthenate | 33 |
| 6% coltbalt naphthenate | 13 |
| Anti-skinning agent | 4 |

The pigments are mixed into the linseed oils with stirring and the resulting mixture is passed through a three-roll paint mill. The remaining ingredients are added and thoroughly blended into the formulation using a Cowles agitator for 3 minutes.

The finished paint is then poured into a series of test containers, the proportion of paint in each container weighing 150 grams. Various concentrations of the test compound as indicated in the following table are hand mixed into different samples of paint, after which each paint-chemical mixture is passed through the three-roll paint mill three times. Test samples of paint containing similar concentrations of a commercially used biocidal compound are prepared in the same manner for comparison purposes.

The general procedure for testing mildew resistance in paints as outlined on page 6 of "Paint Mildew and Its Control" (Nuodex Products Co., Inc. 1952) is followed. This procedure conforms to the Federal Test Method 6271 for determining mildew resistance. Sheets of No. 40 Whatman filter paper are given two successive coats of each paint sample, allowing time for the first coat to become tack-free before applying the second coat. The paint-impregnated samples are then dried for 48 hours in the laboratory. A dried impregnated sample of each formulation is leached with water, at a flow rate of about 8 liters per hour, for 24 hours. All of the impregnated samples including those leached with water are cut into 1¼-inch squares. Samples are also prepared of paint containing no toxicant for use as a control.

A culture medium is prepared by dissolving 22.5 g. of malt agar in 500 ml. of water and sterilizing the resulting solution for 20 minutes in an autoclave at a pressure of 15 p.s.i. The sterilized medium is poured into 10 cm. Petri dishes and allowed to cool.

Approximately 1.25 ml. of a suspension of the fungus *Pullularia pullulans* is pipetted onto the hardened surface of the culture medium in each culture dish. The inoculum is prepared by first adding 10 ml. of sterile water and 5 drops of a 0.1% solution of non-ionic wetting agent (such as Triton X–100—Rohm & Haas) to a nine-day old culture of the microorganism, gently scraping the surface of the culture and adding the culture suspension to sterile water containing the wetting agent and glass beads. The paint-impregnated test squares are surface-sterilized by dipping into boiling water and are then placed on the center of the inoculated culture medium, after which 0.25 ml. of the inoculum is placed directly on each film surface. The inoculated dishes are incubated at 30° C. for 4 weeks. At the end of this time period, the paint samples are examined for mildew growth. Using this procedure, the following growth ratings (GR) are obtained, the observed fungus growth being rated as 0 for no growth; 10 for complete coverage and from 1 to 9 for increasing coverage and density of mildew. Also in the table is listed in millimeters (mm.) the area of inhibition of growth of the microorganism if any, on the culture medium surrounding the painted test specimen. This area of inhibition is designated as "Z" (zone), and the higher value indicates greater inhibition.

TABLE V

| Compound | Percent concentration by weight | Unleached specimen | | Leached specimen | |
|---|---|---|---|---|---|
| | | GR | Z | GR | Z |
| 2,6-dicyanotrichloropyridine | 0.75 | 0 | 12 | 0 | 9 |
| | 0.50 | 0 | 12 | 0 | 8 |
| | 0.25 | 0 | 5 | 0 | 4 |
| | 0.10 | 0 | 2 | 0 | 2 |
| | 0.05 | 6 | 0 | 1 | 0 |
| Di(phenylmercuric),* dodecenyl succinate (10% Hg, as metal) | 0.75 | 0 | 7 | 0 | 7 |
| | 0.50 | 0 | 6 | 0 | 5 |
| | 0.25 | 0 | 3 | 0 | 2 |
| | 0.10 | 0 | 0 | 1 | 0 |
| | 0.05 | 10 | 0 | 5 | 0 |
| Control | | 10 | 0 | 10 | 0 |

* Manufactured by Nuodex Products Company under the trade name Super Ad-It.

As the above data indicate, 2,6-dicyanotrichloropyridine exhibits at all concentrations tested, greater activity in inhibiting fungus growth than the presently-used mercury-based paint biocide tested at similar levels. The biocidal compound of this invention is not removed by water leaching as the growth inhibition values observed for the water-leached specimens indicate.

Similar experiments for growth inhibition of *Pullularia pullulans* are conducted using test samples of the same paint formulation containing 1%, by weight of some dicyanotrichloropyridines other than the 2,6-dicyano-isomer. Results of these tests, as indicated by the following values, show these compounds to be much less effective even at a much higher concentration in inhibiting the mildew growth than 2,6-dicyanotrichloropyridine. They are likewise inferior in activity to the mercury-based biocide.

TABLE VI

| Compound | Percent concentration by weight | Unleached specimen | | Leached specimen | |
|---|---|---|---|---|---|
| | | GR | Z | GR | Z |
| 2,5-dicyanotrichloropyridine | 1 | 0 | 0 | 0 | 0 |
| 2,4-dicyanotrichloropyridine | 1 | 2 | 0 | 2 | 0 |
| Di(phenylmercuric),* dodecenyl succinate | 1 | 0 | 11 | 0 | 9 |
| Control | | 10 | 0 | 10 | 0 |

*As described previously.

EXAMPLE 6

Following the same test procedure as outlined above, the fungicidal efficiency of 2,6-dicyanotrichloropyridine and two non-mercurial commercial biocides is determined. A specimen containing no toxicant is also used as a control. After the 4-week incubation period of the inoculated samples, the comparative inhibition values obtained are as follows:

TABLE VII

| Compound | Percent concentration by weight | Unleached specimen | | Leached specimen | |
|---|---|---|---|---|---|
| | | GR | Z | GR | Z |
| SA 1013 [1] | 1 | 4 | 0 | 4 | 0 |
| | 0.5 | 8 | 0 | 8 | 0 |
| Dowocil 100 [2] | 1 | 10 | 0 | 10 | 0 |
| | 0.5 | 10 | 0 | 10 | 0 |
| 2,6-dicyanotrichloropyridine | 1 | 1 | 0 | 0 | 0 |
| | 0.5 | 1 | 0 | 0 | 0 |
| Control | | 10 | 0 | 10 | 0 |

[1] 2,3,5,6-tetrachloro-4(methylsulfonyl)pyridine, manufactured by Dow Chemical Company.
[2] 1-(3-chloroallyl)-3,5,7-triaza-1-azoniaadamantane chloride, Dow Chemical Company.

These values show that 2,6-dicyanotrichloropyridine is much more effective in inhibiting growth of the microorganism than either of the commercial biocides tested.

EXAMPLE 7

To determine the fungicidal activity of 2,6-dicyanotrichloropyridine in plastics, the procedure as outlined in ASTM Test Procedure D1924–61T is followed. The test specimens employed are 1-inch circular vinyl chloride polymer films containing various concentrations of the toxicant as shown in the following table. Concentrations of toxicant are based on the total weight of the plastic formulation used to prepare the films. Films are likewise prepared from formulations containing similar levels of a commercially-used biocidal agent for plastics and also those containing a concentration of other dicyanotrichloropyridine isomers.

The films are prepared by casting portions of the following formulation on glass plates and fusing the resin at 350° F. for 5 minutes.

| | Gms. |
|---|---|
| Vinyl chloride emulsion polymer | 600 |
| Dioctyl phthalate plasticizer | 360 |
| Epoxy-type plasticizer | 30 |
| Ba-Cd-Zn stabilizer [1] | 18 |
| Toxicant | As indicated |

[1] 6V-6A-organic ester containing complex of barium, cadmium and zinc metals—Ferro Corp., Chemical Division.

The culture medium employed is the nutrient-salts agar specified in the ASTM procedure having a final pH after sterilization of 6.4. This medium is poured into 6-inch Petri dishes and allowed to harden. The plastic film test specimens are then positioned on the surface of the culture medium in the dishes. At least one plastic film specimen containing no toxicant is included as a control. The suspension of spores of *Aspergillus niger, Aspergillus flavus, Aspergillus versicolor, Penicillium funiculosum, Trichoderma sp.* and *Pullularia pullulans* is prepared as outlined in the test procedure. This suspension is sprayed onto the culture medium and test film specimens as specified employing a DeVilbiss No. 154 atomizer. The inoculated samples are then incubated at 30° C. and at 85 percent relative humidity for 21 days. At the end of this time period, the test samples are examined and the following values are obtained. These values have the following designation:

No observed growth on specimens _____ 0
Traces of growth (<10%) _____ 1
Light growth (10–30%) _____ 2
Medium growth (30–60%) _____ 3
Heavy growth (60% and above) _____ 4

Likewise, values for inhibition of growth in the area around the film specimens are given in millimeters (mm.). This area is designated in the table as "Z," the higher numbers indicating larger areas of inhibition of microbial growth.

TABLE VIII

| Compound | Percent concentration | GR | Z |
|---|---|---|---|
| 2,6-dicyanotrichloropyridine | 0.75 | 0 | 12 |
|  | 0.50 | 0 | 7 |
|  | 0.25 | 0 | 2 |
|  | 0.10 | 0 | 0 |
| V-89* | 0.75 | 0 | 0 |
|  | 0.50 | 1 | 0 |
|  | 0.25 | 4 | 0 |
|  | 0.10 | 4 | 0 |
| 3,4-dicyanotrichloropyridine | 1.0 | 4 | 0 |
| 2,4-dicyanotrichloropyridine | 1.0 | 2 | 0 |
| Control |  | 4 | 0 |

*N(trichloromethyl mercapto)-4-cyclohexane-1,2-dicarboxamide—R.T. Vanderbilt Company.

As these values indicate, 2,6-dicyanotrichloropyridine as tested under these conditions is much more effective than similar levels of the commercial biocide tested under the same conditions. In contrast to the 3,5- and 2,4-dicyanotrichloropyridine isomers, this compound is completely effective in inhibiting microbial growth, although used at a concentration which is reduced ten times.

EXAMPLE 8

This example illustrates the efficiency of 2,6-dicyanotrichloropyridine in inhibiting bacterial growth on plastic surfaces.

Test film specimens, 1 inch in diameter, are prepared from plastic formulations containing various concentrations by weight of this compound and from similar formulations containing a commercial biocide. These specimens are placed on a culture medium of nutrient agar containing beef extract, peptone and salt. Test specimens containing no toxicant material are included as a control.

The test specimens and the culture medium (in Petri dishes) are then inoculated with broth cultures of actively growing $S.$ $aureus$ and $E.$ $coli$ bacteria. The inoculated dishes are then incubated at 37° C. for 24 hours. At the end of this time period the area of inhibition is measured in millimeters (mm.) with the following values obtained:

TABLE IX

| Compound | Percent concentration | Zone of inhibition (mm.) E. coli | S. aureus |
|---|---|---|---|
| 2,6-dicyano trichloro pyridine | 0.75 | 8 | 8 |
|  | 0.50 | 7 | 7 |
|  | 0.25 | 3 | 3 |
|  | 0.10 | 0 | 1 |
| V-89* | 0.75 | 4 | 4 |
|  | 0.50 | 3 | 4 |
|  | 0.25 | 2 | 3 |
|  | 0.10 | 0 | 2 |
| Control |  | 0 | 0 |

*As described previously.

EXAMPLE 9

Test film strips prepared from plastic formulations containing either 2,6-dicyanotrichloropyridine or the commercial biocide employed in Examples 7 and 8 are placed in a Weatherometer maintained at 145°±5° C. and 50% relative humidity. A test specimen containing no toxicant is likewise exposed as a control. After 100 hours exposure, the test specimens are examined with the following results:

TABLE X

| Compound | Percent concentration | GR | Z |
|---|---|---|---|
| 2,6-dicyanotrichloropyridine | 0.75 | 0 | 0 |
|  | 0.50 | 0 | 0 |
| V-89* | 0.75 | 3 | 0 |
|  | 0.50 | 4 | 0 |
| Control |  | 4 | 0 |

*As described previously.

Under conditions simulating outdoor weathering exposure, the biocidal compound of this invention exhibits significantly improved efficiency in inhibiting mildew growth in plastics by comparison to similar levels of a presently used biocide tested under the same condition.

EXAMPLE 10

Following the general provisional method developed by the American Leather Chemists Association for determining the resistance of leather to fungus growth (January 1955), the efficiency of 2,6-dicyanotrichloropyridine as a fungicidal agent for leather is evaluated. For this experiment, vegetable-tanned leather is employed because it is more susceptible to microbial attack than chrome-tanned leather. The inoculum used is an actively-growing fungal spore mixture on sand obtained from the Tanners Council Research Laboratory, Cincinnati, Ohio. This spore mixture contains the following fungi: *Aspergillus repens, Rhizopus arrhizus, Penicillium diversom, Aspergillus niger, Penicillium spinulosum, Aspergillus terreus, Penicillium oxalicum, Penicillium verruculosum, Metarrhizium glutinosum, Aspergillus flavus* and *Gliocladium fimbriatum.* A spore suspension is made by shaking 10 grams of the sand-spore mixture with 100 ml. of distilled water and decanting the aqueous spore suspension from the sand.

A mixed solvent is prepared by blending together cyclohexanone, mineral oil and trichloroethylene in a ratio of 1:2:7, by weight. Aliquots of this solvent mixture (100 g. each) are weighed into beakers and varying concentrations of 2,6 - dicyanotrichloropyridine or of p-nitrophenol are then weighed into these beakers and dissolved in the solvent. p-Nitrophenol is presently used as a biocidal agent for leather. Square specimens, approximately 2 inches in size are cut from the leather and a small hole is cut in each sample. For each concentration of toxicant, at least two specimens are dipped into the appropriate solution. The treated specimens are then allowed to dry, after which they are immersed in distilled water for 5 minutes, removed and blotted dry. Sample specimens are immersed only in distilled water as a control.

The treated sample specimens and the control samples are then inoculated by painting the fungi spore suspension onto all surfaces of the leather. They are then suspended in incubation containers on glass rods inserted through the hole bored in the specimens. They are incubated at 30° C. for 30 days, being observed at weekly intervals for evidence of visual microbial growth. At the end of the test period, the following values for growth ratings (GR) are obtained. In these numerical values, 0=no growth; 1=growth in slight, isolated areas; 2=medium growth; and 3=complete coverage.

TABLE XI

| Compound | Percent concentration | GR |
|---|---|---|
| 2,6-dicyanotrichloropyridine | 0.20 | 0 |
|  | 0.10 | 0 |
|  | 0.05 | 0 |
|  | 0.025 | 0 |
| p-Nitrophenol | 0.20 | 0 |
|  | 0.10 | 1 |
|  | 0.05 | 1 |
|  | 0.025 | 3 |
| Control |  | 3 |

These values indicate that 2,6-dicyanotrichloropyridine is significantly more effective in inhibiting microbial growth on leather than the commercial biocide tested at the same levels and under the same conditions. Upon further testing at lower concentrations under the above described conditions, 2,6-dicyanotrichloropyridine is found to inhibit completely microbial growth on leather at concentrations of 50 parts per million or less of the chemical.

EXAMPLE 11

This example illustrates the efficiency of 2,6-dicyanotrichloropyridine to inhibit and/or control the growth of sulfate-reducing bacterium, *Desulfovibrio desulfuricans,* in media such as the injection waters employed in secondary oil recovery operations. This bacterium is a deteriorative agent in such operations and also in fuel storage tanks, pipelines, etc.

The test procedure employed is the Tenative Time-Kill Test outline in Appendix A, Section A–1 of the American Petroleum Institute Bulletin API RP38 (May, 1959) entitled "Recommended Practice for Biological Analysis of Water-Flood Injection Waters." In this procedure, the test medium is artificial sea water prepared by dissolving the prescribed quantity of sea salt as obtained commercially in distilled water as outlined in Appendix A, Section A–III of the API test procedure. To one-ounce dropping bottles are added sufficient quantities of a solution of the test chemical in dimethyl sulfoxide to provide the desired test concentrations of chemical in each bottle when diluted with a quantity of the artificial sea water medium to provide a total of 25 ml. of fluid per bottle. Similar concentrations of a standard chemical used for its biocidal properties are prepared for comparison purposes. After preparation of the toxicant-sea water media, the dropping bottles are brought to a temperature of 30° C. in a water bath and inoculated. The inoculum is 0.25 ml. of a 1–100 dilution of a broth culture of the foregoing described sulfate-reducing bacterium, which inoculum is from the third successive 24-hour transfer of an actively-growing culture. One hour after inoculation, 1-ml. aliquots are removed from each bottle and placed in test tubes containing 9 ml. of the sulfate-reducer medium outlined in Section 1, paragraph 19, of the API test procedure. (This medium, which contains yeast extract, sodium lactate, ascorbic acid, metallic hydrogen phosphates and sulfates, salt and agar, is used for counting the bacteria in waters containing over 20,000 p.p.m. total solids.) From these tubes, dilutions of 1–10 and 1–100 are made for each chemical in additional tubes of the sulfate-reducer medium. Following inoculation, the tubes are stoppered, the contents therein are mixed thoroughly and the tubes are then stored in an incubator maintained at 37° C. for 3 weeks. At the end of this time period the number of black bacterial colonies of the sulfate-reducing bacterial species are counted in each test tube. Using this procedure, the results obtained show that at a concentration of less than 5 parts per million, 2,6-dicyanotrichloropyridine is effective in killing at least 99 percent of the microorganisms. However, more than 20 parts per million of the similarly tested, commercially used chemical, Arquad T2C (mixed monoalkyl and dialkylammonium chloride—Armour Industrial Chemical Company) must be employed to provide the same level of biocidal effectiveness.

EXAMPLE 12

This test illustrates that 2,6-dicyanotrichloropyridine is as effective as presently known and used biocidal agents for protecting cloth, i.e., textiles and other materials, such as paper and wood from microbiological deterioration by cellulose-destroying organisms. The test procedure employed is the Soil Burial Test outlined in the American Association of Textile Chemists and Colorists (AATCC) Technical Manual, 1965 edition, designated as Tentative Test Method AATCC–30–1957T. In this test, specimens which are treated with the test chemical and also untreated specimens as controls are buried in soil rich in rot-producing fungi as outlined in the test procedure. The specimen cloth swatches employed are 6 inches long and 1 inch wide (ravelled) as specified in the test procedure. The specimens are treated with the biocidal agent of this invention by dipping them in an acetone solution containing 0.5% concentration of the chemical, by weight. For comparison purposes, other cloth specimens are similarly treated with acetone solutions of other compounds known and used as cloth protectants.

After treatment, the sample specimens are wetted out with water containing 0.05 percent of a nonionic wetting agent. They are then placed in the prepared soil, care being taken to insure uniform contact with the soil along the length of the specimens. After being incubated in the soil for 10 days at a temperature of 82°±2° F., the test specimens are removed from the soil and gently washed and dried. Breaking strengths of these specimens are determined on a tensilometer according to Method 5104 described under Federal Specification CCC–T–191b (Ravelled Strip Method). Using this procedure, the following results are obtained:

TABLE XII

| Compound | Concentration tested, percent | Breaking strength, pounds |
|---|---|---|
| 2,6-dicyanotrichloropyridine | 0.5 | 108 |
| Copper naphthenate | 0.5 | 113 |
| Dichlorophene* | 0.5 | 103 |
| Control | ---- | 0 |

*Sindar G–4 (Sindar Corporation).

EXAMPLE 13

This example illustrates the permanence properties of 2,6-dicyanotrichloropyridine in protecting cloth from microbiological deterioration. In this procedure, the soil burial test as outlined in the foregoing example is repeated, using test specimens treated with acetone solutions containing 1.0%, by weight, of the different toxicants. Prior to being incubated for 12 days in soil maintained at 82° F.±2° F. some of the treated sample specimens are leached with water for 12 hours and some for 24 hours. After the incubation period, the sample specimens are removed from the soil, gently washed and dried, and then breaking strength are determined as described previously. The following results are obtained:

TABLE XIII

| Compound | Breaking strength, pounds | | |
|---|---|---|---|
| | As treated | Leached 12 hours | Leached 24 hours |
| 2,6-dicyanotrichloropyridine | 102 | 105 | 105 |
| Dichlorophene,* 96% active | 104 | 91 | 80 |
| Copper naphthenate | 112 | ---- | 109 |
| Control | 0 | 0 | 0 |

*As described previously.

As these data indicate, 2,6-dicyanotrichloropyridine is more permanent than dichlorophene in protecting the cloth from rotting and degrading in strength properties. It is substantially on a par with copper naphthenate for permanence in fungicidal activity. However, since the blue-green color of copper naphthenate limits its use as an industrial biocide in protecting cellulosic materials, it is believed that the use of 2,6-dicyanotrichloropyridine as the biocidal agent for these materials provides a distinct advantage.

What is claimed is:

1. An industrial fungicidal and bactericidal composition comprising as an essential active ingredient, from 0.05% to 3.0%, by weight, of 2,6-dicyanotrichloropyridine, and the balance an inert organic solvent.

2. The method for protecting a substrate selected from the group consisting of leather, cloth, plastics, wood and paper against attack by microorganisms selected from the group consisting of fungi and bacteria which method comprises contacting said substrate with the fungicidal and bactericidal composition of claim 1.

3. The method of claim 2 wherein the substrate to be protected is impregnated on the surface thereof with a coating of a paint composition containing from 0.05% to 3.0% of 2,6-dicyanotrichloropyridine, by weight of the paint composition.

4. The method of claim 3 wherein the amount of 2,6-dicyanotrichloropyridine in the paint composition ranges from 0.1% to 1%, by total weight thereof.

5. The method of claim 2 wherein the substrate to be protected is contacted on the surface thereof.

6. The method of claim 5 wherein the substrate to be protected is leather.

7. The method of claim 5 wherein the substrate to be protected is a plastic film.

References Cited

UNITED STATES PATENTS

| | | | |
|---|---|---|---|
| 3,200,035 | 8/1965 | Martin et al. | 424—304 |
| 3,325,503 | 6/1967 | Bimber | 424—263 |

ALBERT T. MEYERS, Primary Examiner

V. D. TURNER, Assistant Examiner

U.S. Cl. X.R.

106—15

UNITED STATES PATENT OFFICE
CERTIFICATE OF CORRECTION

Patent No. 3,549,762            Dated December 22, 1970

Inventor(s) Russell M. Bimber

It is certified that error appears in the above-identified patent and that said Letters Patent are hereby corrected as shown below:

Column 1, line 62, should be deleted.

Column 2, line 28, change "viocide" to --biocide--.

Column 3, line 25, change "treated surface is allowed to dry prior to being put into" to --textiles and it also may be used to control and/or inhibit--.

Signed and sealed this 13th day of April 1971.

(SEAL)
Attest:

EDWARD M. FLETCHER, JR.          WILLIAM E. SCHUYLER, JR.
Attesting Officer                   Commissioner of Patents